March 4, 1930. T. A. KILLMAN 1,749,140
MOTION PICTURE PROJECTING MACHINE
Filed Dec. 21, 1925 2 Sheets-Sheet 1

INVENTOR
THOMAS A. KILLMAN,
by James L. Hopkins, ATTORNEY.

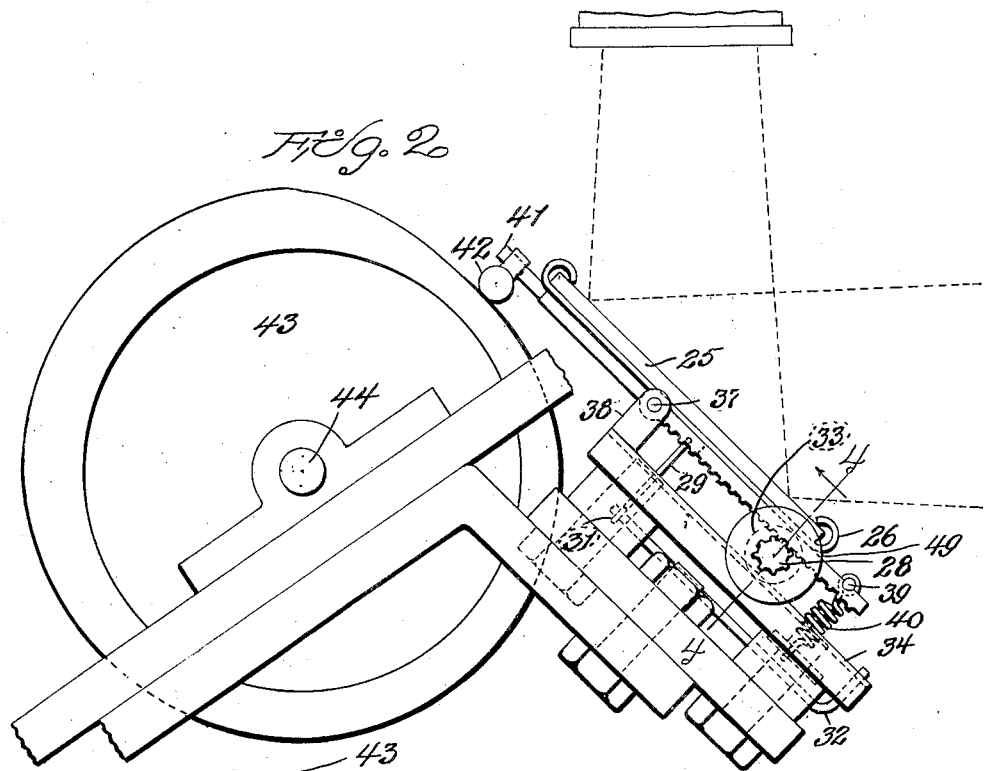
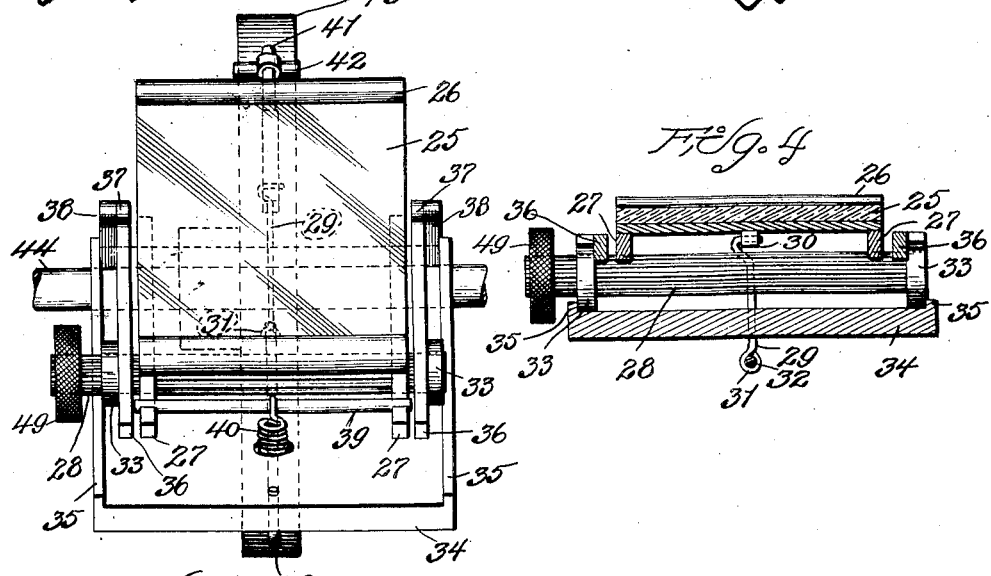

Patented Mar. 4, 1930

1,749,140

UNITED STATES PATENT OFFICE

THOMAS A. KILLMAN, OF NASHVILLE, TENNESSEE

MOTION-PICTURE-PROJECTING MACHINE

Application filed December 21, 1925. Serial No. 76,607.

My invention relates to improvements in motion picture projecting machines and has for its particular object to provide an optical rectifier consisting of a single oscillating reflector operated by a cam and provided with means for adjusting the size of the angle through which the mirror oscillates, with reference to the light-column received and transmitted by it.

The rectifier is provided with means for effecting the adjustment above referred to, and such means are preferably within convenient reach of the operator while the projecting machine is in operation, so that the mirror adjustment may be accomplished without interrupting the operation of the machine.

It is essential to the successful operation of the projecting machine that this adjustment be effected while the machine is in operation, and the light is on, in order that the operator can tell at once when the proper adjustment has been accomplished.

If making the adjustment required the machine to be at rest, the adjustment would be a matter of guess, and its correctness could be established only by test upon the screen, after the operation of the machine had been resumed.

The purpose of the oscillating mirror is as follows:

If a film be fed continuously through a projecting machine the pictures will not be stationary on the screen but will move very rapidly upward across the screen. In order to counteract this movement it is necessary to use some kind of compensating device which will neutralize this movement and cause the pictures to be stationary on the screen. For this purpose I use a single oscillating mirror or reflector placed in the column of light and caused to oscillate by means of a cam-wheel. The picture is reflected by the oscillating mirror to the screen. The reflector must be caused to oscillate in synchronism with the continuously moving film. That is, the amount of oscillation, or the size of the angle through which the reflector oscillates must be so regulated or adjusted and timed that it will tend to cause the picture on the screen to move downward at exactly the same rate of speed that the continuously moving film tends to cause it to move upward so that the result is there is no movement of the picture in either direction but will remain stationary on the screen which is the object sought for. The slightest variation of this adjustment will cause the pictures on the screen to jump.

As it is amost impossible to figure out in advance the proper amount of oscillation to give the reflector it is very necessary to provide some kind of adjusting device by which it can be regulated. Then again, when it is desired to use a lens, for example, of shorter focal length which projects a larger picture on the screen, the angle of oscillation must be increased, that is, it must be adjusted in accordance with the size of the picture, that is, according to the focal length of the lens used.

Drawings

In the drawings, Fig. 1 is a side elevation of a projecting machine embodying my invention.

Fig. 2 is an enlarged side elevation of the optical rectifier of my invention.

Fig. 3 is a front elevation of said optical rectifier.

Fig. 4 is a transverse sectional view of the same taken on the line 4—4 of Fig. 2.

Description

Figure 1:
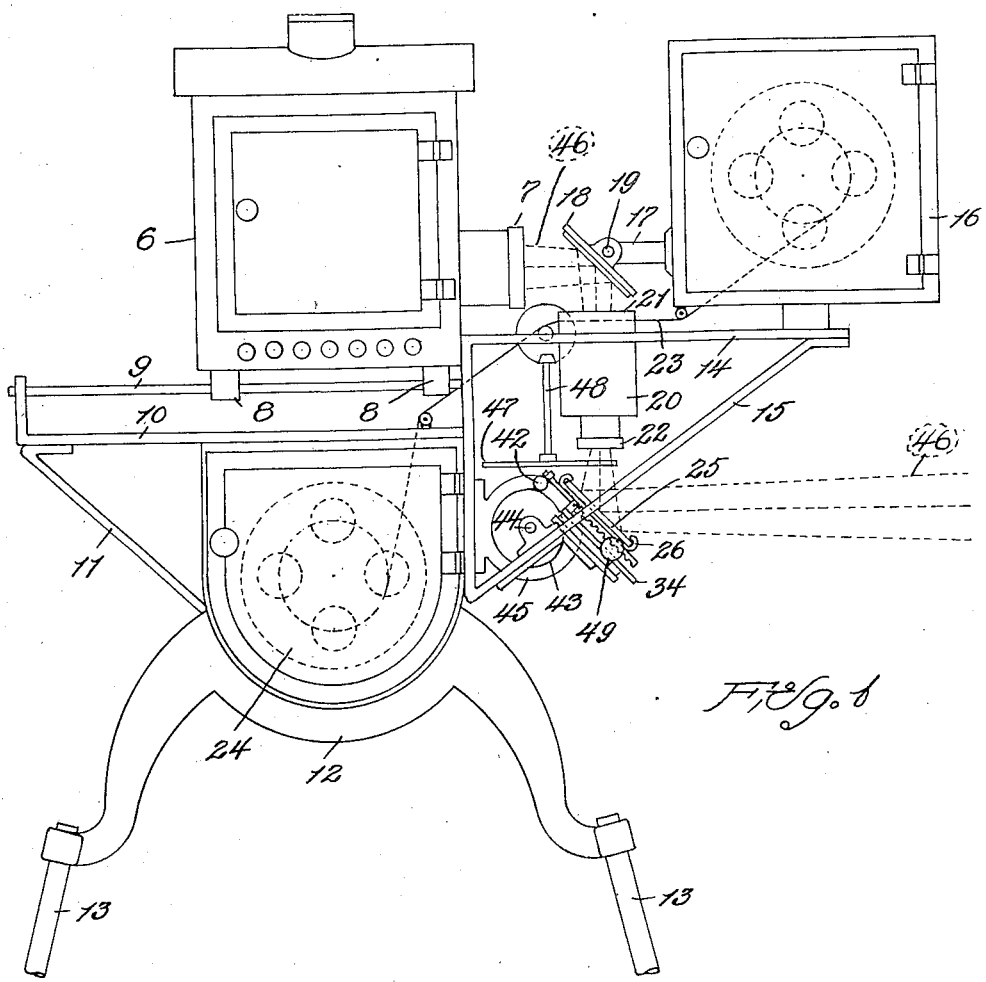

In the drawings, I have illustrated (Fig. 1) the general organization in which the optical rectifier of my invention is employed. In that organization I have indicated a lamp house 6 having a projecting lens 7. The lamp house 6 is adjustably mounted by means of blocks 8—8 sliding on rods 9, the rods 9 being supported by base 10 which in turn is supported by the braces 11, cradle 12 and legs 13. The cradle 12 also supports the bracket 14 and brace 15.

A film-magazine 16 is mounted upon the bracket 14 and is provided with a projecting arm 17 upon which the deflecting mirror 18 is pivoted at 19.

Beneath the deflecting mirror 18 is the tube 20 having the film-window 21 and lens 22.

The film 23 passes across the aperture of the window 21 and into the take-up magazine 24, as shown.

The transmission mirror 25 is mounted in a frame 26. That frame 26 is provided upon its rear face with racks 27—27 engaging and fulcrumed upon the pinion 28 and held in engagement with said pinion 28 by means of the hook 29 engaging the eye 30 on the back of the frame 26, the hook 29 having the loop 31 mounted on the spring 32. The pinion 28 is provided with rollers 33 traveling in a bed plate 34 having side flanges 35. The rack-bars 27 are held in contact with the pinion 28 by means of the cross-bar 39 and coiled spring 40, the tension of the spring 40 serving to keep the teeth of the racks 27—27 in engagement with the pinion 28. A pair of rack bars 36 pivoted at 37 to standards 38—38 are held in contact with the pinion 28 by weight.

Extending upwardly from the top of the frame 26 is a stud 41 carrying a cylindrical foot 42, which foot 42 in turn rests upon the outer face of the cam 43. The cam 43 is mounted on the shaft 44, which shaft 44 is driven by the electric motor 45 mounted upon the brace 15 as shown in Fig. 1.

The cam 43 is so formed as to impart the proper periodical dip to the mirror 25 in synchronism with the shifting of the film-pictures. The foot 42 is at all times kept in sliding contact with the face of the cam 43 by means of the tension of the spring 32; and said foot 42 remains at all times operative in the same directional relationship to the cam shaft 44, regardless of the adjustment of the transmission mirror 25. Said cam 43 is formed as shown and is arranged to make a single revolution for each film image, while it has, as illustrated, a smoothly curved continuous peripheral surface.

*Mode of operation*

To enable the operation of the device of my invention to be more readily understood I have indicated the rays projected from the lens 7 by dotted lines which may be termed for convenience, the light-column 46. This light-column 46 first impinges upon the mirror 18, is thence deflected downwardly passing through the film 23 in its progress across the film-window 21, through the lens tube 20 and through the lens 22, thence impinging upon the mirror 25 from which it is projected in a general horizontal direction as indicated in Fig. 1.

I have indicated in Fig. 1 a revolving shutter 47 mounted upon the shaft 48, the shaft 48 being driven from the shaft 44 by suitable connecting means; as the device of my invention may be used with or without a supplemental shutter such as 47.

The particular problem dealt with by this invention is the projection of the light-column 46 by the mirror 25 to the screen. That screen may be at any normal range of distance from the projecting machine, and the accurate focusing of the picture carried by the light-column 46 is accomplished jointly by the focusing of the lens 22 and by the adjustment of the mirror 25, formed and mounted as above described. The pinion 28 is provided with the knurled head 49, and the rotation by the operator of that knurled head 49 adjusts the position of the pinion 28 upwardly and downwardly, the ends of the rack-bars 36—36 being fixed at 38. That operation of the knurled head 49 adjusts the fulcrum or pivotal points of the mirror 25 by reason of the contact of the pinion 28 with the teeth upon the rack bars 27—27, these rack bars 27—27 being mounted upon the rear face of the mirror-frame 26 as above described. This shifting of the fulcrum of the mirror 25 and its frame 26 by the operation of the knurled head 49, is accomplished without disturbing the operative positions of the stud 41 and foot 42 in relation with the face of the cam 43.

It will be noted that when the knurled thumb-wheel 49 is turned, the rollers 33 slide the bed-plate 34, while the pinion 28, remains in engagement with, and rolls along the rack-bars 27—27 and 36—36

By means of the described construction I can effect a very delicate adjustment of the mirror 25 with reference to the focal plane of the light-column 46 and can thus project upon the screen at various distances the picture carried by the light-column 46 with accurate focus, bringing out with great exactness the depth, or light-and-shade values of the picture; also, as indicated above, this delicate adjustment of the mirror 25 is accomplished without interrupting the operation of the projecting machine.

I am aware that it has heretofore been proposed to transmit the light-column in machines of this class by adjusting a reflector bodily relative to the picture film, and I disclaim such mechanical construction as being foreign to my invention, wherein the reflector is bodily fixed in relation to the picture film and its movements are only those produced by the cam, and its only adjustment is produced by moving back and forth the pinion upon which the mirror has pivotal contact and is fulcrumed as above set forth.

Various changes of structure can be effected in the device just described without departure from my actual invention as defined in the following claims.

I claim:

1. In a machine of the class described, an optical rectifier comprising a mirror; a rack mounted upon the back of said mirror; a pinion; means for keeping said rack in contact with said pinion; and a receiving base for said pinion comprising a bed plate and a rack pivotally mounted above said bed plate; said latter rack normally being in engagement with said pinion; together with a cam arranged to oscillate said mirror.

2. In a motion picture projecting machine, an optical rectifier comprising a mirror having a frame, means for oscillating said mirror including a cam, a fulcrum engaging said frame of the mirror, and means for shifting the fulcrum with respect to the frame and at right angles to the axis of oscillation of the mirror and in the direction of the plane of the mirror.

3. In a motion picture projecting machine, an optical rectifier comprising a mirror, a frame mounted on the mirror, means for oscillating the mirror and frame, a fulcrum engaging the frame, a base carrying the fulcrum, and means on the fulcrum and movable in relation to the frame to shift the fulcrum in relation to said base.

4. In a motion picture projecting machine, an optical rectifier comprising a mirror, a frame mounted on the mirror, means for oscillating the mirror and frame, a fulcrum, a base on which the fulcrum is movably mounted, means on the frame engaged by the fulcrum, and means on the fulcrum and movable in relation to the frame and by contact with the means on the frame to shift the fulcrum in relation to said base.

5. In a motion picture projecting machine, an optical rectifier comprising a mirror, a rack device carried by the mirror, cam means for oscillating the mirror, a fulcrum, a base on which the fulcrum is movably mounted, and means on the fulcrum engaging the rack device and movable in relation to the mirror by contact with the rack device to shift the fulcrum in relation to the base.

6. In a motion picture projecting machine, an optical rectifier comprising a mirror and a frame carrying the mirror, means for oscillating the said mirror and frame, racks carried by the frame, a base, and a fulcruming device on the base including means meshing with the racks and movable to different positions with respect to the frame, yielding means for holding the mirror and frame on the fulcruming device, and means for adjusting the fulcruming device with respect to the base without interrupting the oscillatory motion of the mirror.

In testimony whereof I hereunto affix my signature.

THOMAS A. KILLMAN.